United States Patent
Kargula

[11] Patent Number: 5,887,911
[45] Date of Patent: Mar. 30, 1999

[54] QUICK CONNECT FLUID COUPLING WITH A SELF-CONTAINED RELEASABLE COLLET RETAINER

[75] Inventor: Christopher J. Kargula, Sterling Heights, Mich.

[73] Assignee: Form Rite, Auburn Hills, Mich.

[21] Appl. No.: 543,029

[22] Filed: Oct. 13, 1995

[51] Int. Cl.⁶ ........................................... F16L 37/22
[52] U.S. Cl. ........................... 285/307; 285/323; 285/332
[58] Field of Search ................................. 285/305, 307, 285/308, 319, 321, 322, 323, 332, 39

[56] References Cited

U.S. PATENT DOCUMENTS

| | | |
|---|---|---|
| 4,756,558 | 7/1988 | Beamer . |
| 4,781,400 | 11/1988 | Cunningham . |
| 4,793,639 | 12/1988 | Glover et al. . |
| 4,850,622 | 7/1989 | Suzuki ................................. 285/321 X |
| 4,979,765 | 12/1990 | Bartholomew . |
| 5,100,182 | 3/1992 | Norkey et al. . |
| 5,125,694 | 6/1992 | Gobbi ..................................... 285/307 |
| 5,161,834 | 11/1992 | Norkey . |
| 5,181,751 | 1/1993 | Kitamura ............................. 285/308 X |
| 5,195,787 | 3/1993 | Bartholomew . |
| 5,228,728 | 7/1993 | McNaughton et al. . |
| 5,248,168 | 9/1993 | Chichester et al. . |
| 5,284,369 | 2/1994 | Kitamura . |
| 5,378,025 | 1/1995 | Szabo . |
| 5,415,825 | 5/1995 | Sellers ................................. 285/319 X |
| 5,443,289 | 8/1995 | Guest ................................. 285/308 X |
| 5,553,895 | 9/1996 | Karl et al. ........................... 285/308 X |
| 5,580,100 | 12/1996 | Umezawa et al. .................. 285/308 X |

FOREIGN PATENT DOCUMENTS 2089455   6/1982   United Kingdom ................... 285/308

*Primary Examiner*—Heather Shackelford
*Attorney, Agent, or Firm*—Terrence Martin; Jules Jay Morris; Sean Detweiler

[57] ABSTRACT

A quick connect coupling having a self-contained releasable collet generally comprises a housing having an axial bore extending inwardly from an entrance. The axial bore includes a large diameter portion adjacent the entrance. A tube having a bead of relatively large diameter is insertable into the bore. A generally annular radially expandable collet disposed within the bore of the housing expands upon insertion of the tube into the housing and contracts onto the tube between the bead and the housing, thereby retaining the tube within the housing. The tube is selectably releasable from the housing by an annular pilot disposed within the housing having an inclined surface complementary to an inclined surface on the collet. Release members are provided to facilitate axial inward movement of the collet into the housing. The collet then rides up the inclined surface of the pilot, thereby radially expanding the collet and releasing the tube from the housing.

22 Claims, 3 Drawing Sheets

QUICK CONNECT FLUID COUPLING WITH A SELF-CONTAINED RELEASABLE COLLET RETAINER

BACKGROUND OF THE INVENTION

The present invention relates to a quick connect fluid coupling having a self-contained releasable collet retainer.

Quick connect couplings are used to quickly and securely connect a tube within a housing bore or to a second tube. Quick connect couplings are utilized in most modern vehicles to connect brake lines, air conditioning lines, power steering lines and other high-pressure and vacuum lines.

In standard quick connect couplings a retainer is received within a female housing bore. The retainer has a plurality of arms which extend radially inwardly in a direction moving axially into the bore. The tube has a radially greater bead which moves into the bore and flexes the arms outwardly. The axially and radially innermost ends of the arms define an inner diameter approximately equal to the other diameter of the tube at locations other than the bead. As the tube is inserted further into the bore, the bead forces the arms radially outwardly, and moves axially past the arms. Once the bead has moved axially beyond the arms, the arms spring back to a position where they are radially outwardly of the tube, and axially between the tube bead and outer end of the bore. The tube is then fully inserted, and the retainer securely retains the tube within the housing.

While quick connect couplings having flexible arms that latch behind the bead are widely used, they do have some deficiencies. The retainers only secure the tube at the circumferentially spaced locations of the legs. Because of the limited contact area, the operation of this type of retainer is highly dependent on the material, length, angle, thickness, and the number of arms. Also, temperature extremes diminish the effectiveness of the arms as they become brittle when cold and softened when hot. Further the flexible arms trap the tube in the connector, but do not offer side load support to the coupling. Further the flexible arms require a relatively large insertion distance because the tube bead must be inserted past the flexible arms.

Sometimes one may wish to remove a tube after insertion. The prior art has proposed release tools to assist in removal. Essentially, the prior art tools are sleeves that slide along the tube. Upon axial inward movement of the release tool, the retainer legs are deflected outwardly to permit separation of the tube and housing.

The use of collet retainer, generally comprising a ring having a split, has been proposed to retain the tube within the housing. The collet is expanded radially by the tube bead upon insertion of the tube into the housing. The collet contracts onto the tube behind the tube bead to retain the tube within the housing. These retainers address some of the deficiencies with the above-described retainers having spaced legs. However, the proposed collet retainers have not been easily releasable and have not included release tools.

SUMMARY OF THE INVENTION

The present invention provides a quick connect coupling having a self-contained, reusable release structure. The quick connect coupling generally includes a housing having an axial bore extending into the housing from an entrance. The axial bore includes a tapered or ramped portion of increasing diameter between the entrance and a portion of relatively large diameter. A tube having a bead of relatively large diameter is insertable into the axial bore of the housing. The retainer is a collet structure, generally comprising a ring having at least one split to permit expansion of the collet radially. The tube is releasably retained within the housing by the radially expandable collet which provides a wedge between the tube bead and the housing. In one embodiment, a spring within the housing biases the collet toward the entrance of the housing, thereby keeping the collet in proper position. In another embodiment no spring is used. The collet retainer provides stronger side load support to the connection while also permitting a shorter insertion distance of the tube into the housing, because the collet provides support to the connection around the entire diameter of the tube and centers itself as a wedge against the housing. The tube can be repeatedly connected and disconnected from the housing quickly and easily.

A pilot disposed within the housing includes a radially inclined surface complementary to a radially inclined surface on the collet such that upon axial movement of the collet into the housing, the collet "rides up" the inclined surface of the pilot and expands radially, thereby releasing the tube from the housing.

Moreover, structure on the collet facilitates movement into the housing to release the tube. Preferably, release members extend from the collet outwardly of the housing.

BRIEF DESCRIPTION OF THE DRAWINGS

The above, as well as other advantage of the present invention, will become readily apparent to those skilled in the art from the following detailed description of a preferred embodiment when considered in light of the accompanying drawings in which.

DETAILED DESCRIPTION OF A PREFERRED EMBODIMENT

Figure 1:
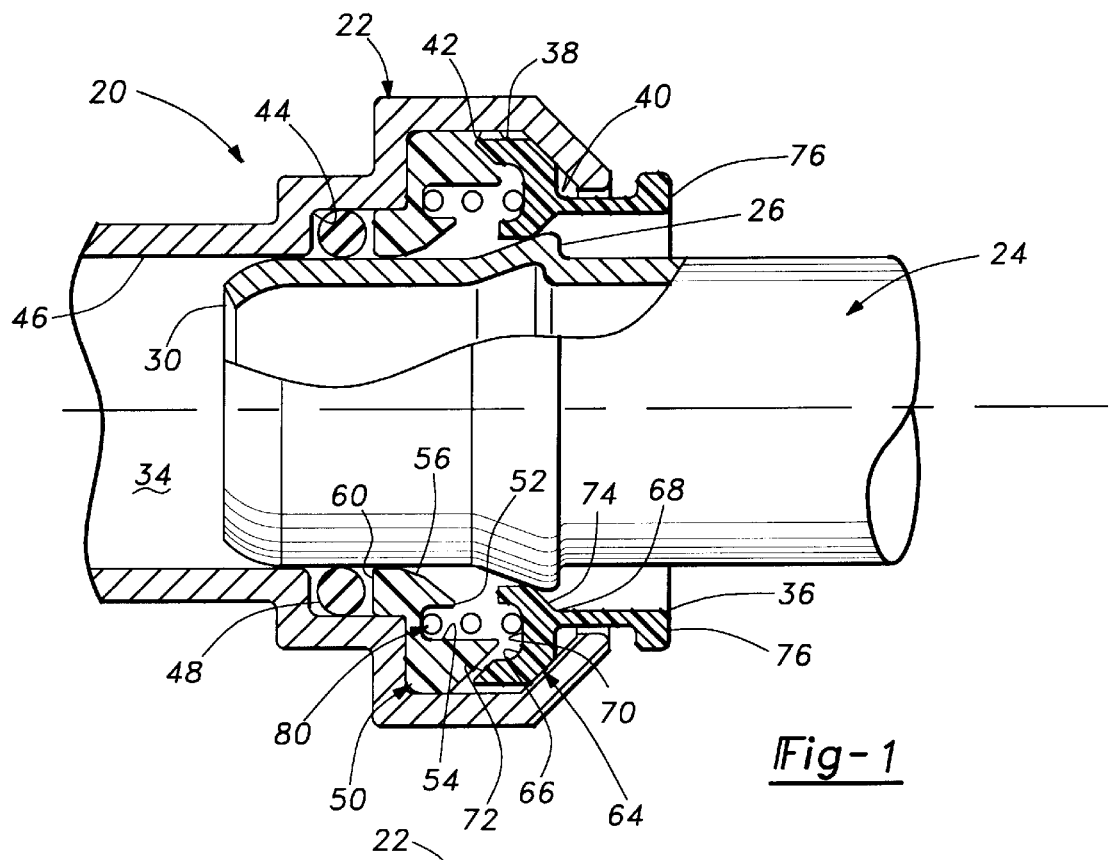
FIG. 1 is a cross-sectional view of a quick connect coupling of the present invention during insertion of the tube into the housing.

A releasable, self-contained quick connect coupling 20 is shown generally in FIG. 1. The quick connect coupling 20 generally comprises a housing 22 for connection with a tube 24. The tube 24 has a radially greater diameter bead 26 spaced from an inner end 30 of the tube 24. The housing 22 includes an axial bore 34 extending inwardly into the housing 22 from an entrance 36. The axial bore 34 includes a first portion 38 of increasing diameter adjacent the entrance 36. The first portion 38 includes a tapered portion 40 between the entrance 36 and a portion 42 of relatively large diameter. Axially inward of the first portion 38 is a seal cavity portion 44 of reduced diameter. A conduit portion 46 of further reduced diameter is axially inward of the seal cavity portion 44.

A seal 48, such as a rubber O-ring, is disposed within the seal cavity 44. An annular pilot 50 has an axially outer end

3

52 with an annular recess 54 defined between a radially inward annular surface 56 and a radially outward annular surface 58. The radially inward annular surface 56 is inclined radially inwardly moving axially into the housing 22. The radially outward annular surface 58 is inclined radially outwardly moving axially into the housing 22. The pilot 50 further includes a ring 60 extending axially inward from the pilot 50. The pilot 50 is inserted into the portion 42 of relatively large diameter of the housing 22 with the ring portion 60 of the pilot 50 disposed within the seal cavity portion 44 of the housing 22.

The quick connect coupling 20 further includes an annular, radially expandable, normally contracted collet 64 having an axial inner end 66 and opposite outer end 68. The inner end 66 of the collet 64 includes an annular recess 70. Radially outward of the annular recess 70 is an inclined surface 72 which is inclined radially outward moving axially into the housing 22 and is complementary to the radially outward surface 58 of the pilot 50. The outer end 68 of the collet 64 includes an inwardly inclined surface 74 which is inclined radially inwardly moving axially into the housing. At least one and preferably two release members 76 extend axially outwardly from the outer end 68 of the collet 64. The release members 76 preferably each comprise a distinct tab 76 extending from the outer end 68 of the collet 64. Alternatively, one or more than two tabs 76 could extend from the outer end 68 of the collet 64. The collet 64 is disposed within the first portion 38 of the housing 22, axially outwardly of the pilot 50.

A spring 80, such as a coil or helical spring, is disposed within the annular recess 54 of the pilot 50 and the annular recess 70 of the collet 64, and biases the collet 64 axially outwardly against the housing 22 at the tapered portion 40.

Alternatively, the collet could be molded with an integral spring. The collet may function generally as described in the copending application entitled "Quick Connect Fluid Coupling With Collet Retainer", Ser. No. 08/543,216 filed on even date herewith, and by the inventor of this application. Also, the tube described in that application may also be used in this invention.

As can be seen in FIG. 1, upon insertion of the tube 24 into the connector body housing 22, bead 26 engages the inner inclined surface 74 at the outer end 68 of the collet 64, causing the collet 64 to move axially into the housing 22. As will be explained below, the collet 64 is able to expand radially outwardly while in the portion 42. Essentially, the collet 64 moves inwardly with the tube 24 and is ramped along surface 58 to expand, as will be explained below. This allows the bead 26 to move through the collet 64.

Figure 2:
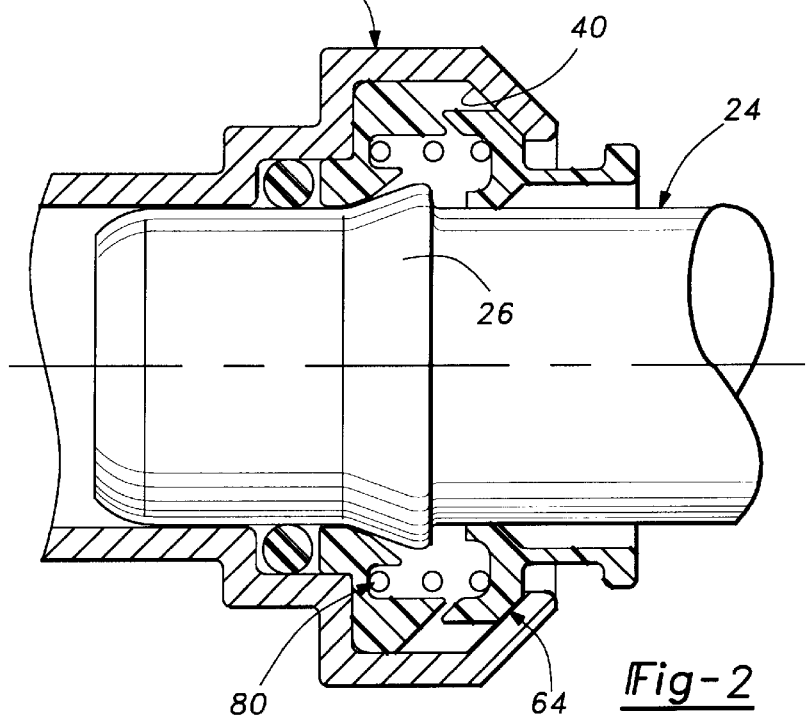
FIG. 2 is a cross-sectional view of the quick connect coupling of FIG. 1 after the tube has been connected with the housing.

As shown in FIG. 2, once the bead 26 is inserted past the collet 64, the spring 80 biases the collet 64 outwardly against the tapered portion 40 of the housing 22 and the collet 64 contracts against the tube 24. When the tube bead is forced against the collet, as when the fluid conduit is pressurized, the collet 64 provides side load support to the connector assembly 20 by providing a wedge around the entire circumference of the bead 26 and tapered portion 40 of the housing 22. Since the collet provides securement over the entire circumference it results in a better connection than prior art collet that may have only secured over a portion of the circumference. The collet is less sensitive to material, dimensional, and temperature variations than retainers utilizing flexible arms. Further, the spring 80 ensures the proper position of the collet 64 despite vibration which can occur during operation.

Figure 3:
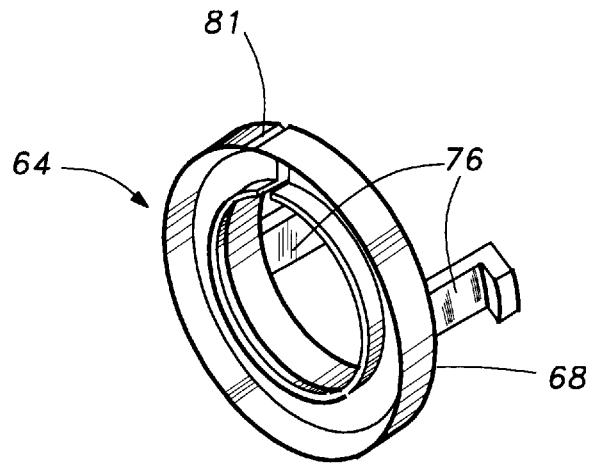
FIG. 3 is a perspective view of the collet shown in FIG. 1.

As can be seen in FIG. 3, the collet 64 generally includes a split 81 to allow radial expandability, but the collet 64 is normally contracted. The split allows the collet to expand radially to allow tube insertion. The details of the split may also be as described in the above-referenced patent application. The collet 64 includes at least one and preferably two release members 76 extending axially outwardly from the collet.

Figure 4:
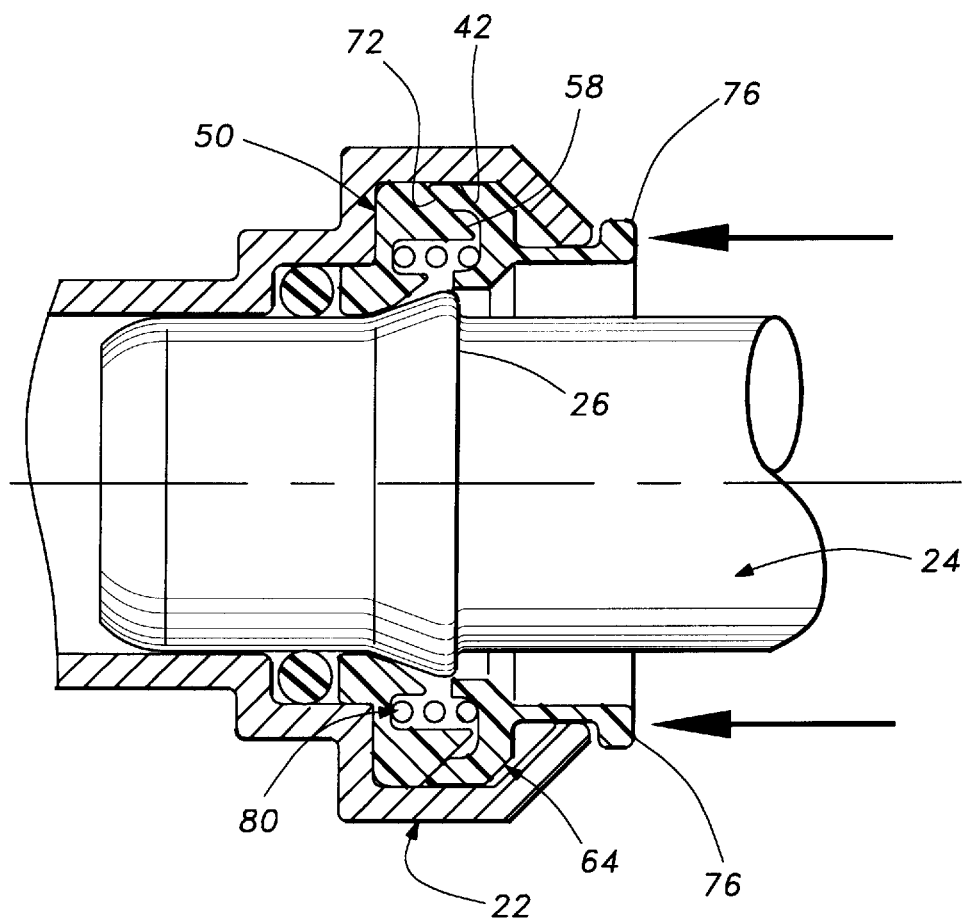
FIG. 4 is a cross-sectional view of the quick connect coupling of FIG. 1, with an axially compressed, radially expanded collet.

Referring to FIG. 4, the tube 24 can be released from the housing 22 by moving the release members 76 axially inward. Upon inward movement of the release members 76, the collet 64 compresses the spring 80 and moves axially into the housing 22 into the portion 42 of relatively large diameter. Simultaneously, the inclined surface 72 engages the radially outward inclined surface 58 of the pilot 50 to expand the collet 64 radially at split 81. The tube may now be removed from the housing 22.

It should be understood that the connector body housing 22 could alternatively be formed from multiple separate components, such as a two piece housing wherein the first portion 38 is formed separately from the rest of the housing 22. Alternatively, the housing 22 can be formed integrally with the pilot 50. It should also be understood that the spring 80 can be integral with the collet 64, by forming flexible extensions from the inner end 66 of the collet 64.

The quick connect coupling 20 of the present invention can be released and reconnected numerous times quickly and easily. The spring 80 insures that the collet 64 will remain properly positioned as a wedge between the tube 24 and the housing 22, and prevents vibration from causing the collet 64 to inadvertently move axially into the housing 22 and expand radially, thereby releasing the tube 24 during operation.

Figure 5:
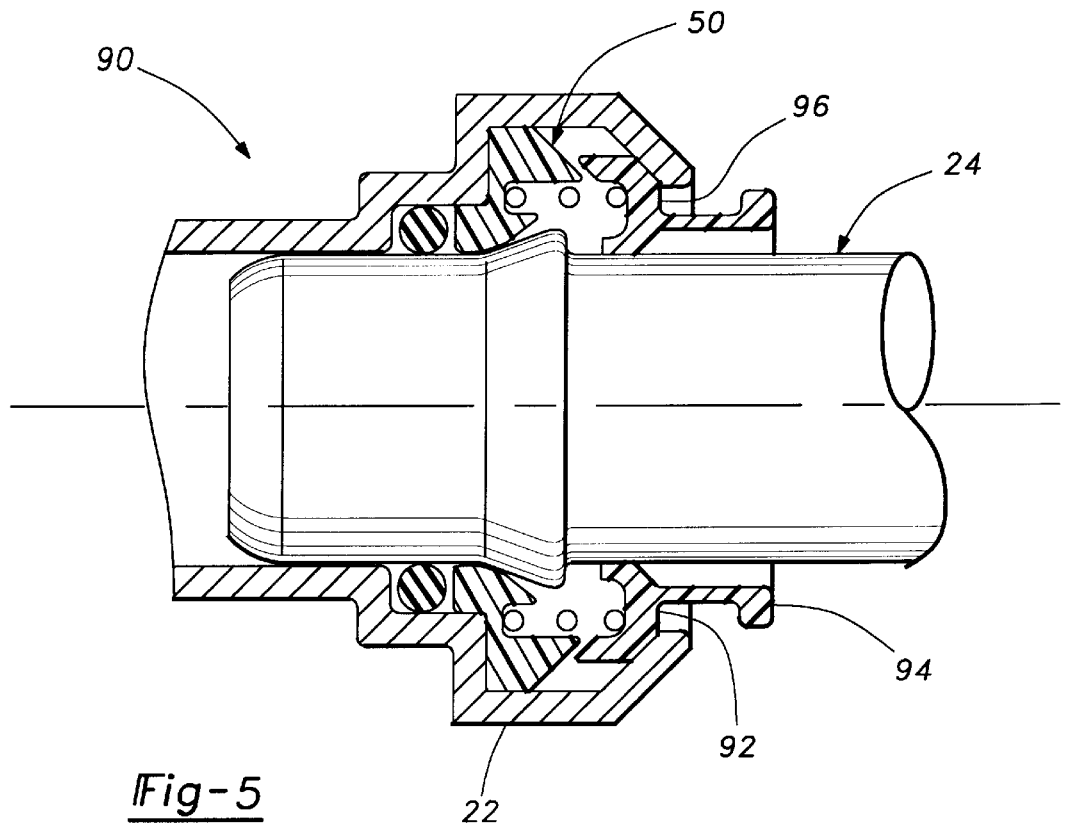
FIG. 5 is the quick connect coupling of FIG. 1 utilizing an alternative collet.

As can be seen in FIG. 5, the quick connect coupling 90 of the present invention could use an alternative collet 92 having a generally cylindrical release member 94 extending outwardly from the outer end 96 of the collet 92. In this embodiment, the split 81 will also extend through the cylindrical release member 94.

Figure 6:
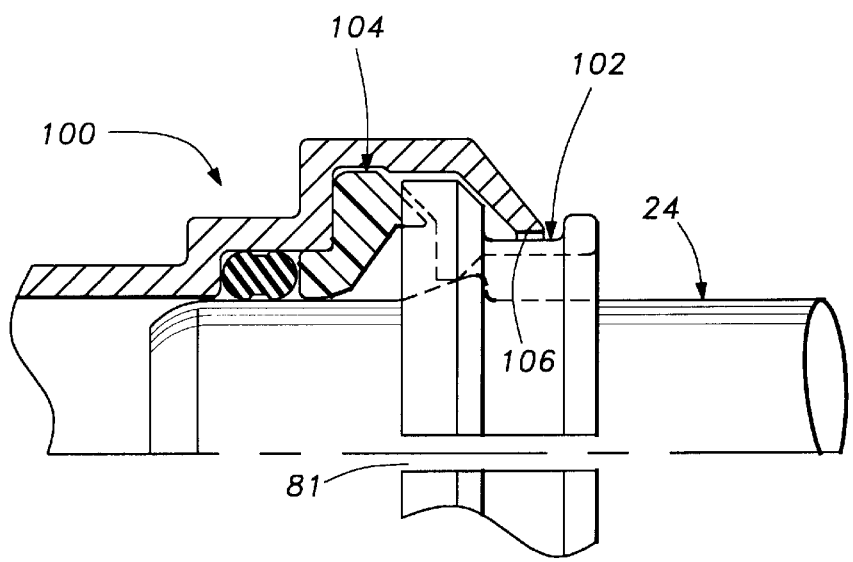
FIG. 6 is a partially broken away view of an alternative quick connect coupling utilizing an alternative collet and alternative pilot.

As can be seen in FIG. 6, the quick connect coupling 100 of the present invention may be manufactured without a spring. An alternative collet 102 and alternative pilot 104 do not include the annular recesses to retain the spring. The collet's 102 normal tendency to contract will tend to move the collet 102 off of the tapered pilot 104, toward the entrance 106 and onto the tube 24.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A quick connect coupling comprising:

a housing defining an axial bore extending into said housing from an entrance;

a tube having a bead of relatively large diameter formed on said tube, said tube insertable into said bore;

a radially expandable, generally annular collet having an attached release member extending from said housing, said collet contracting radially inwardly onto said tube axially outward of said bead, thereby retaining said tube in said housing, said collet disposed within said bore; and means for selectively expanding said collet radially upon axial movement of said attached release member to release said tube from said housing.

2. The quick connect coupling of claim 1 including a generally annular pilot disposed within said axial bore, said pilot having an axially outer surface, said collet including an axially inner surface, said inner surface of said collet engaging said outer surface of said pilot upon inward axial movement of said collet, and expanding said collet radially outwardly.

3. The quick connect coupling of claim 2 wherein said axially outer surface of said pilot is inclined radially outwardly moving axially into said housing.

4. The quick connect coupling of claim 2 wherein said axially inner surface of said collet is inclined radially outwardly moving axially into said housing.

5. The quick connect coupling of claim 2 wherein said axially inner surface of said collet is inclined radially outwardly moving axially into said housing, said axially outer surface of said pilot is inclined radially outwardly moving axially into said housing and complementary to said inner surface of said collet.

6. The quick connect coupling of claim 2 wherein said pilot is formed separately from said housing and disposed within said housing.

7. The quick connect coupling of claim 1 wherein said collet further includes at least one release member extending axially from said housing.

8. The quick connect coupling of claim 7 wherein said release member is a cylindrical extension from said collet.

9. The quick connect coupling of claim 7 wherein said release member comprises at least one tab extending axially outwardly from said collet.

10. The quick connect coupling of claim 1 further including a spring disposed within said bore and biasing said collet axially outwardly toward said entrance of said housing.

11. The quick connect coupling of claim 10 wherein said spring is formed separately from said collet.

12. The quick connect coupling of claim 10 wherein said collet has a split to allow radial expansion.

13. The quick connect coupling of claim 1, wherein said release member extends axially from said housing.

14. The quick connect coupling of claim 1, wherein said collet is moved axially into said housing while being expanded radially upon activation of said release member.

15. The quick connect coupling of claim 1, wherein said release member is formed integrally with said collet.

16. The quick connect coupling of claim 1, wherein said collet has a collet body with a slot extending generally axially through the entirety of said collet body, said slot allowing said collet to expand radially, and said collet having a holding portion which is contracted radially inward onto the majority of said tube bead to retain said tube bead.

17. A quick connect coupling comprising:
 a housing defining an axial bore extending inwardly into said housing from an entrance, said axial bore increasing in diameter axially into said housing from said entrance;
 a tube having a bead, said tube insertable into said bore;
 a radially expandable collet, said collet including an axially inner surface inclined radially outwardly moving axially into said housing, said collet disposed within said bore, said collet having at least one release member extending axially outwardly from said housing;
 a spring within said housing, said spring biasing said collet axially outwardly;
 a generally annular pilot disposed within said axial bore, said pilot having an axially outer surface inclined radially outwardly moving axially into said housing and being complementary to said inner surface of said collet such that said inner surface of said collet rides up said outer surface of said pilot upon inward axial movement of said collet, thereby expanding said collet radially outwardly to release said tube.

18. The quick connect coupling of claim 17 wherein said pilot is formed separately from said housing and disposed within said housing.

19. The quick connect coupling of claim 17 wherein said release member comprises at least one tab extending axially outwardly from said collet.

20. The quick connect coupling of claim 19 wherein said release member is cylindrical.

21. A method for assembling a quick connect coupling including the steps of:
 providing a housing defining an axial bore extending inwardly into said housing from an entrance;
 forming a bead of relatively large diameter on a tube; said tube insertable into said bore;
 inserting a radially expandable, generally annular collet into said bore;
 inserting said tube into said bore of said housing, said collet being expanded radially outward by said bead and retracting radially inwardly on said tube axially outward of said bead upon insertion of said tube into said bore, thereby retaining said tube in said housing;
 selectively expanding said collet radially outward to release said tube from said housing;
 wherein said collet is provided with attached release structure extending from said housing to allow said collet to be inserted into said housing and expand to allow release of said tube; and
 wherein the step of selectively expanding further includes the step of moving said collet axially relative to said housing by imparting a force on the attached release structure.

22. A quick connect coupling comprising:
 a housing defining an axial bore extending into said housing from an entrance;
 a tube having a bead of increased diameter formed on said tube, said tube insertable into said bore;
 a radially expandable, generally annular collet disposed within said bore, said collet contracting radially inward onto said tube axially outward of said bead, thereby retaining said tube in said housing;
 a generally annular pilot disposed within said axial bore, said pilot having an axially outer surface, said collet including an axially inner surface inclined radially outward moving axially into said housing, said inner surface of said collet engaging said outer surface of said pilot upon inward axial movement of said collet, and expanding said collet radially outward.

* * * * *